April 16, 1935.  F. DREXEL  1,997,881
EGG CRACKING MACHINE
Filed Feb. 20, 1934   4 Sheets-Sheet 1
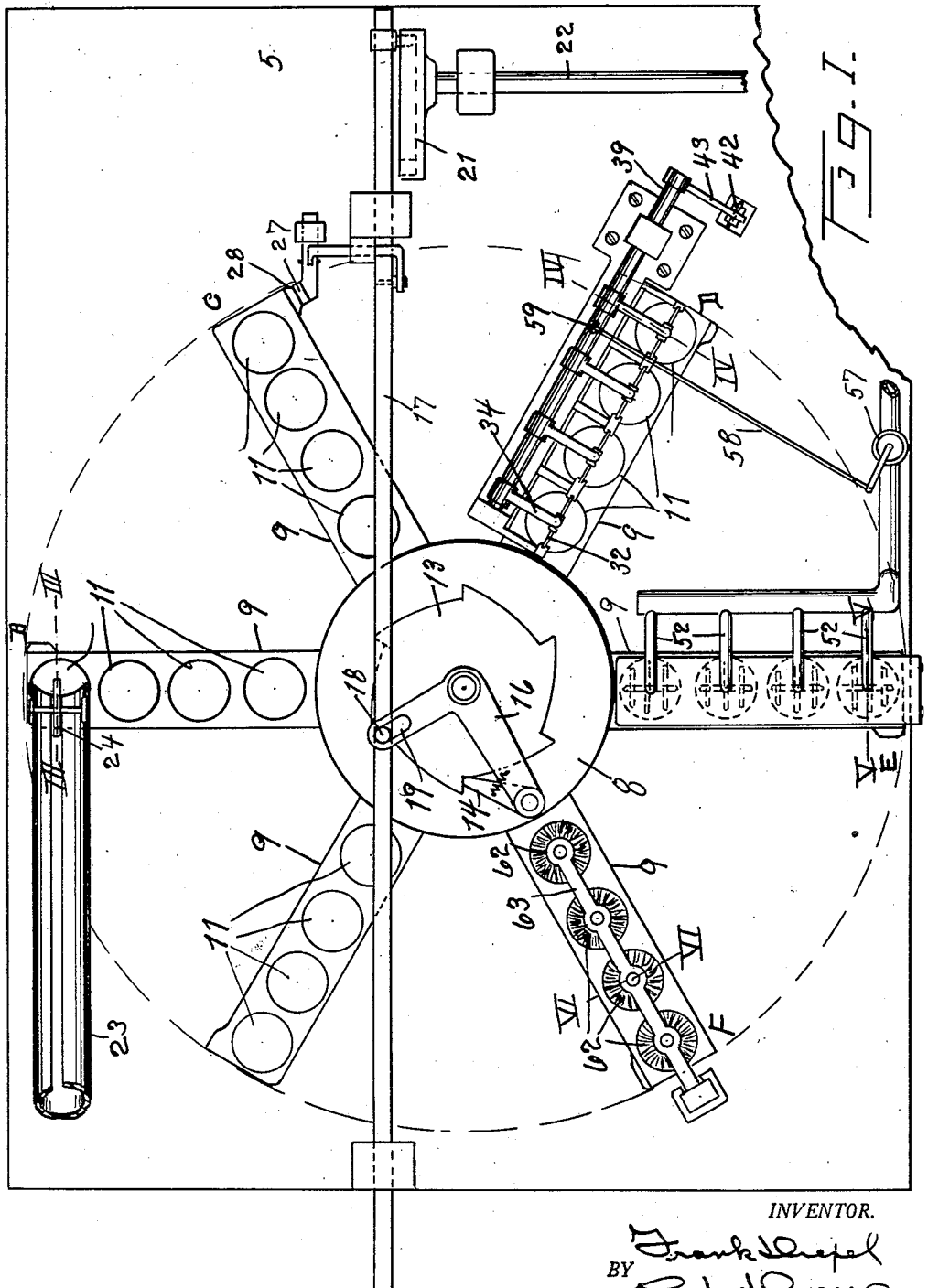
INVENTOR.
Frank Drexel
BY
ATTORNEY.

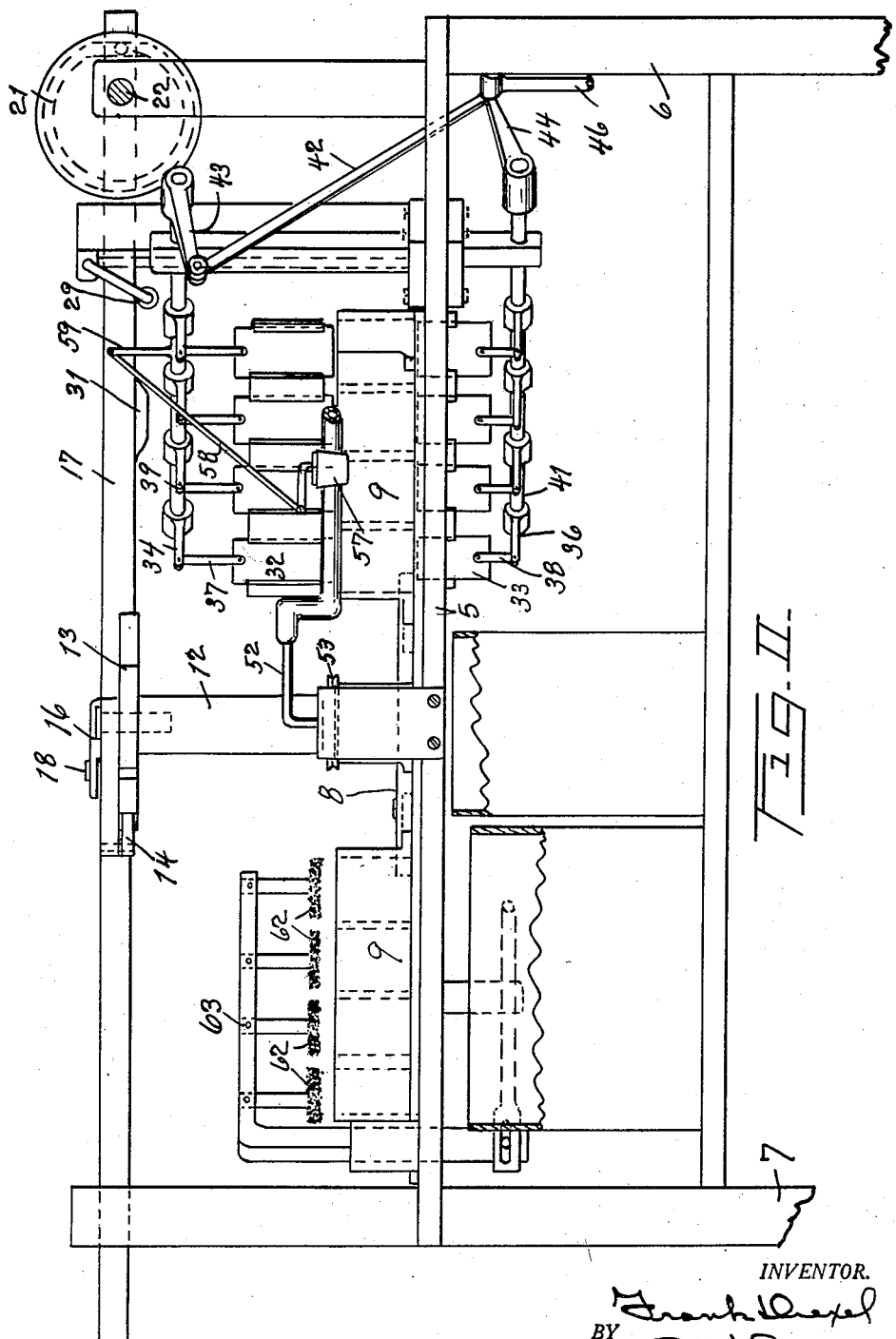

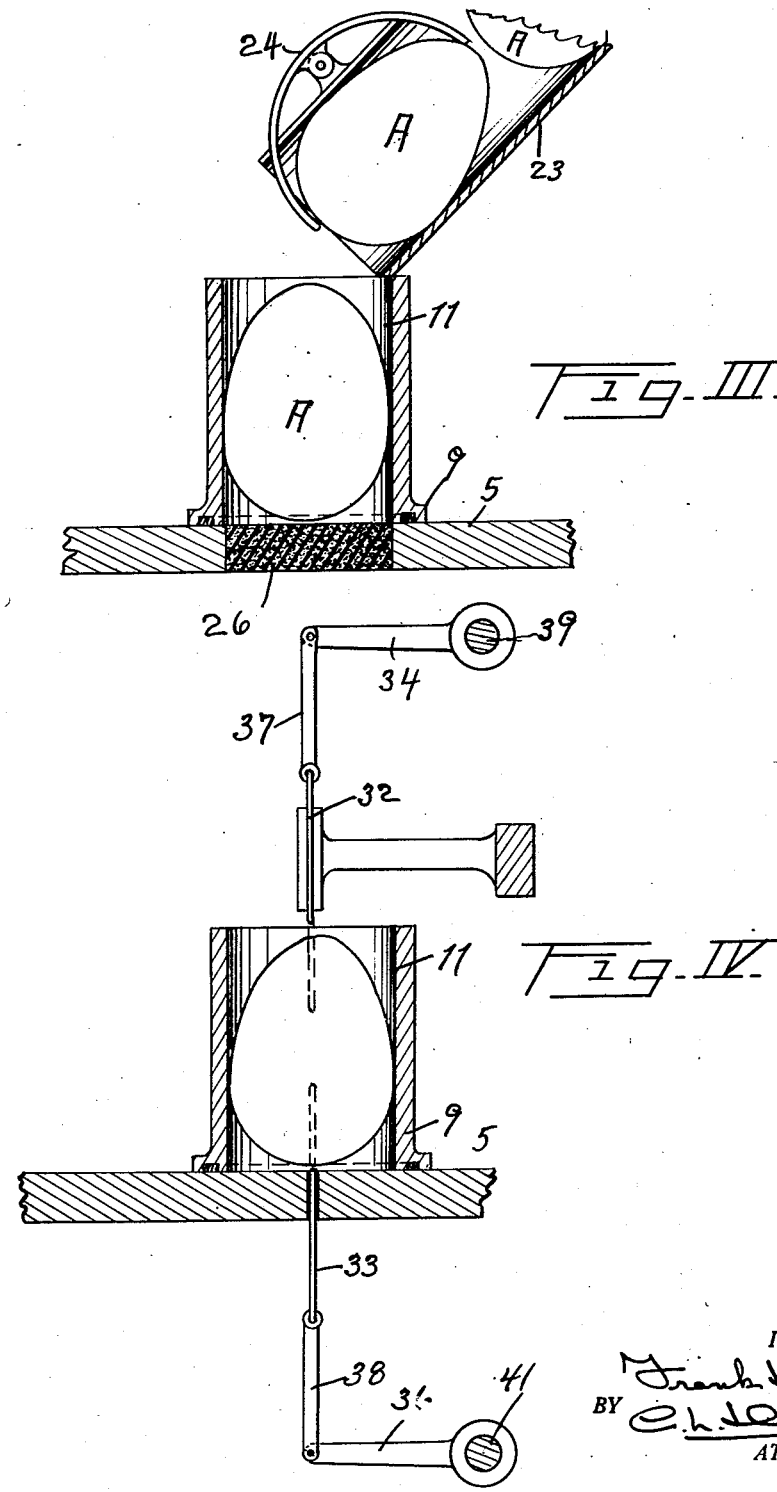

April 16, 1935.  F. DREXEL  1,997,881
EGG CRACKING MACHINE
Filed Feb. 20, 1934  4 Sheets-Sheet 4
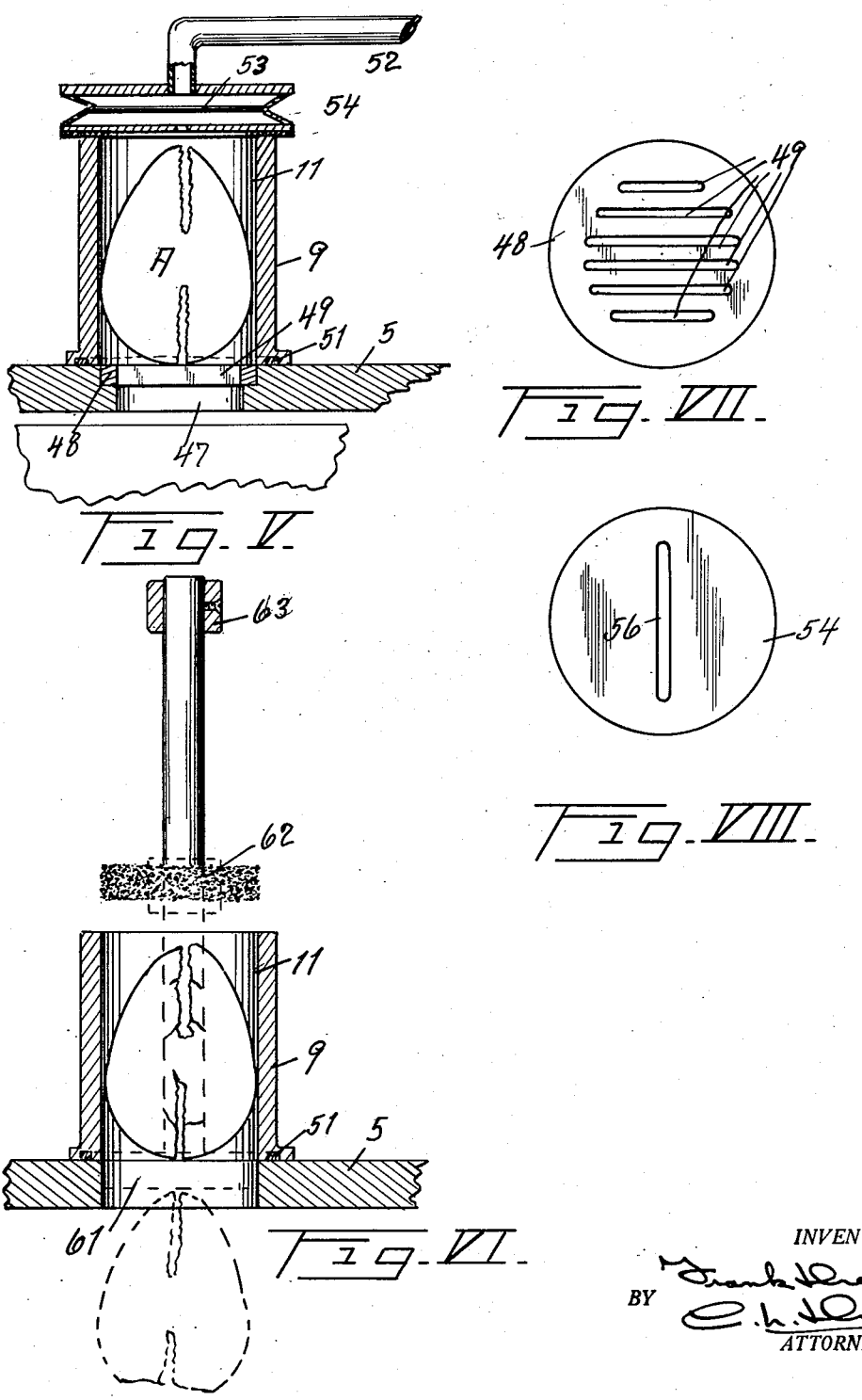

Patented Apr. 16, 1935

1,997,881

UNITED STATES PATENT OFFICE 1,997,881

EGG CRACKING MACHINE

Frank Drexel, San Francisco, Calif.

Application February 20, 1934, Serial No. 712,155

6 Claims. (Cl. 146—2)

This invention relates to improvements in egg breaking and extracting machines.

The principal object of the invention is to produce a device for breaking the shell of an egg and removing the contents therefrom.

Another object is to provide means whereby a large number of eggs may be continuously passed through the machine and the contents of each egg extracted from its shell.

A further object is to provide means whereby the separation of the contents of the shell is accomplished in such a manner that none of the shell pieces will be discharged into the egg contents.

A still further object is to produce a machine which is economical to manufacture, sanitary and one which is easily operated.

Other objects and advantages will be apparent during the course of the following description.

In the accompanying drawings forming a part of this specification and in which like numerals are employed to designate like parts throughout the same, Fig. I is a top plan view of my machine, Fig. II is a side elevation of Fig. I, Fig. III is a cross sectional view on the line III—III of Fig. I, Fig. IV is a cross sectional view on the line IV—IV of Fig. I, Fig. V is a cross sectional view on the line V—V of Fig. I, Fig. VI is a cross sectional view on the line VI—VI of Fig. I, Fig. VII is a plan view of the separator plate, and Fig. VIII is a top plan view of the blower plate.

In many industries, a large number of eggs are employed in many instances running into several thousand eggs per day. Heretofore it has been common to have these eggs broken by hand against the edge of a receptacle, the operator dropping the contents in the receptacle and the shells in a refuse can. This method of breaking the eggs was tedious and resulted in a considerable number of pieces of shell falling into the egg receptacle. Applicant has, therefore, devised a method of handling the eggs which is expeditious and one which permits the contents of the egg to be extracted from the shell in a manner that eliminates the shell particles becoming mixed with the egg content.

In the accompanying drawings wherein for the purpose of illustration is shown a preferred embodiment of my invention, the numeral 5 designates a table top having supporting legs 6 and 7. Mounted upon this top is a rotatable disc 8 and radiating from the disc are arms 9. These arms are each provided with parallel bores 11 which are virtually egg cups. A shaft 12 is secured to the disc 8 and has a ratchet 13 secured to its upper end. This ratchet is engaged by a spring-pressed dog 14 carried upon a pivoted bell crank lever 16. The bar 17 is preferably reciprocated by a cam 21 mounted upon a shaft 22. This cam is of such a contour that it will cause a rapid movement of the bar 17 in one direction and a slow return movement in the opposite direction with a period of rest between the two movements, the purpose of which will be later seen. At 23 I have shown an egg chute and in order to simplify the drawings, but one chute is illustrated, it being understood that there is an individual chute for each egg cup or bore 11.

Referring now to Fig. III it will be noted that the eggs A coming down the chute 23 are engaged by a trip 24. This trip is in the form of an escapement so that it will allow one egg to drop from the chute into the egg cup, while preventing the next egg in the chute from moving into the cup, until the escapement mechanism has again been actuated. In this figure it will be noted that a sponge rubber pad 26 is mounted in the surface of the table top 5, the purpose of which is to prevent breakage of the egg as it falls from the chute 23 into the egg cup.

Referring now to Fig. I, a stop 27 is shown which is moved into and out of alignment with an abutment 28 formed upon the end of the arm 9. This stop 27 is actuated by a roller 29 contacting a cam 31 carried on the undersurface of the bar 17. This stop serves to definitely position the arms as they are intermittently rotated upon the table top.

Referring now to Fig. IV it will be noted that the egg cup is positioned between a pair of sliding knives 32 and 33 which are mounted in suitable guides. These knives are actuated by arms 34 and 36 through the medium of connecting links 37 and 38, respectively. The levers 34 and 36 are mounted upon shafts 39 and 41, respectively, which are mounted above and below the table top (see Fig. I). These two shafts are operated in unison by a connecting link 42 extended between levers 43 and 44, which are in turn connected to the shafts 39 and 41, respectively. A connecting rod is shown at 46 for actuating this mechanism.

Referring now to Fig. V it will be noted that the arm 9 is so positioned on the table that the egg cup is directly over an opening 47 formed in the table top and that this opening 47 has a separator plate 48 positioned therein so that the egg shell will rest thereon during the period of separation. It is here noted that the slots 49 formed in the separator plate are at right angles to the cut formed in the egg shell by the knives 32 and 33. A sealing strip 51 is formed in the bottom of each of the arms 9 so that when the arm 9 reaches the position shown in this figure the air pressure employed for separating the contents of the egg from the shell will not escape. The air means consists of a pipe 52 extending into a bellows 53 which bellows carry blower plates 54, which are adapted to contact the top of each of the egg cups 11. Each one of these blower plates has a slot 56 which slot is so arranged as to be directly above and in alignment with the slot cut in the top of the egg shell. Therefore, this slot 56 is at right angles to the slot 49 of the plate 48. The pipe 52 is provided with an air valve 57 which may be actuated in any convenient manner. In the present instance I have shown a rod 58 which extends between the air valve handle and a post 59 formed upon the shaft 39.

Referring now to Fig. VI it will be noted that the arm 9 is now positioned above an opening 61 formed in the table 5 and that a brush 62 is directly above the egg cup 11. This brush is removably held in an arm 63 which is reciprocated through a linkage properly timed to actuate the brushes at the proper interval.

In order to better understand the action of the machine, the cycle will be described. Eggs descending in the chute 23 will be automatically discharged into the cups 11 by the escapement mechanism 24, the eggs falling upon the rubber pads 26 will be prevented from breaking. We will now assume that the egg cups beneath the chutes (one of which has been shown in the drawings) have been filled. The shaft 22 is revolving but during the time the escapement mechanism is actuating the position of the cam is such that the arms 9 are at a momentary rest. The cam now commences to function pulling upon the rod 17 which first releases the stop 27, then through the action of the bell crank lever 16 and dog 14, the ratchet 13 is rotated a partial revolution. This brings the arm full of eggs from position B to position C. This position C is merely an intermediate position and therefore we will proceed to position D which will be brought about by the next reciprocation of the rod 17. During the time that the arm 9 is in the position D, motion will be transmitted to the shafts 39 and 41 and consequently the knives 32 and 33 will cut into the egg shell from both the top and the bottom, and will then be withdrawn therefrom (see Fig. IV). The next reciprocation of the rod 17 will move the arm with the egg shells just cut, to the position E at which point the air will function to expand the bellows 34 forming a seal between the bellows and the top of the egg cups or arm and a blast of air will be discharged directly from the opening 56 in the blower plate into the slit cut in the upper portion of the egg, with the result that this air discharging into the egg will force the contents of the egg through the slot in the bottom thereof and thence through the separator plate into a suitable receiving receptacle placed beneath the table. The separator plate will prevent the shell from passing downwardly with the contents of the egg. On the next reciprocation of the rod 17 the arm will be moved so that the egg cups will be over the openings 61 in the table top and at this time the brushes 62 will move downwardly through each of the egg cups and discharge the shells therefrom, should any of them tend to stick.

Thus it will be seen that I have provided a device which will receive the egg, cut it, blow it and discharge the shell, and as a matter of fact the shells being discharged from the machine in most instances have the appearance of being whole eggs, the cut being relatively narrow so that in reality the knives virtually crack the egg and force the two portions thereof away from each other. Thus it is apparent that there is no loose broken shell which can become mixed with the egg contents. From the position F the cycle is repeated.

It will thus be seen that I have produced a device which will perform all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a receptacle, means for depositing an egg in said receptacle, means for moving said receptacle between opposed knives mounted for moving vertically into said receptacle from opposite ends thereof, whereby the shell of said egg will be cracked, fluid pressure means for discharging the contents of said egg after said shell has been cracked, said means including an air jet discharging into and through the cracked shell of said egg.

2. In an egg cracking machine, a table, a disc formed on said table, arms carried by said disc, said arms having egg cups formed therein, means for depositing eggs in said cups, means for intermittently rotating said arms on said table top, opposed knives supported on said table top and mounted for engaging said eggs in said cups from opposite ends whereby the shells of said eggs will be cracked, and means for blowing a jet of air into the cracked shell of each of said eggs while said eggs are in said cups.

3. In an egg cracking machine of the class described, a table, a disc formed on said table and embodying radially disposed arms, a plurality of egg cups formed on said arms, means for depositing eggs in said cups, means for rotating said arms on said table, means for intermittently stopping the rotation thereof, vertically disposed knives carried by said table and mounted for engaging said eggs in said cups from opposite ends thereof, and means for forcing a jet of air through the cracked eggs while in said cups to eject the contents thereof.

4. In an egg cracking machine of the class described, a table, a disc formed on said table and embodying radially disposed arms, a plurality of egg cups formed on said arms, means for depositing eggs in said cups, means for rotating said arms on said table, means for intermittently stopping the rotation thereof, vertically disposed knives carried by said table and mounted for engaging said eggs in said cups from opposite ends thereof, means for forcing a jet of air through the cracked eggs while in said cups to eject the contents thereof, and means for carrying the emptied shells beyond the point of ejection of the contents of said eggs.

5. In an egg cracking machine of the class described, in combination, a table, of a disc formed on said table and embodying radially disposed arms, a plurality of egg receiving cups formed on said arms, means for depositing eggs in said cups, means for intermittently rotating said arms on said table, means for intermittently interfering with the rotation thereof, vertically disposed knives carried by said table and mounted for cracking said eggs at their opposite ends while in said cups, means for forcing a jet of air through the cracked eggs while in said cups to eject the contents thereof, means for carrying the shells beyond the point of ejection of the contents, and means for finally cleaning all remaining particles from said cups.

6. In an egg cracking machine of the class described, a table, a disc formed on said table and embodying radially disposed arms, a plurality of egg receiving cups formed on said arms, means for depositing eggs on end in said cups, means for the progressive step by step rotation of said arms, means for intermittently stopping the rotation thereof at a predetermined point, shell cracking knives arranged on said table in vertically disposed pairs and adapted to simultaneously operate toward each other, air jet means for ejecting the contents of said eggs through the cracked shell thereof, means for carrying the emptied shells beyond the point of ejection of the contents of said eggs, means for ejecting the emptied shells, and means for finally cleansing said cups for the next successive operation.

FRANK DREXEL.